UNITED STATES PATENT OFFICE.

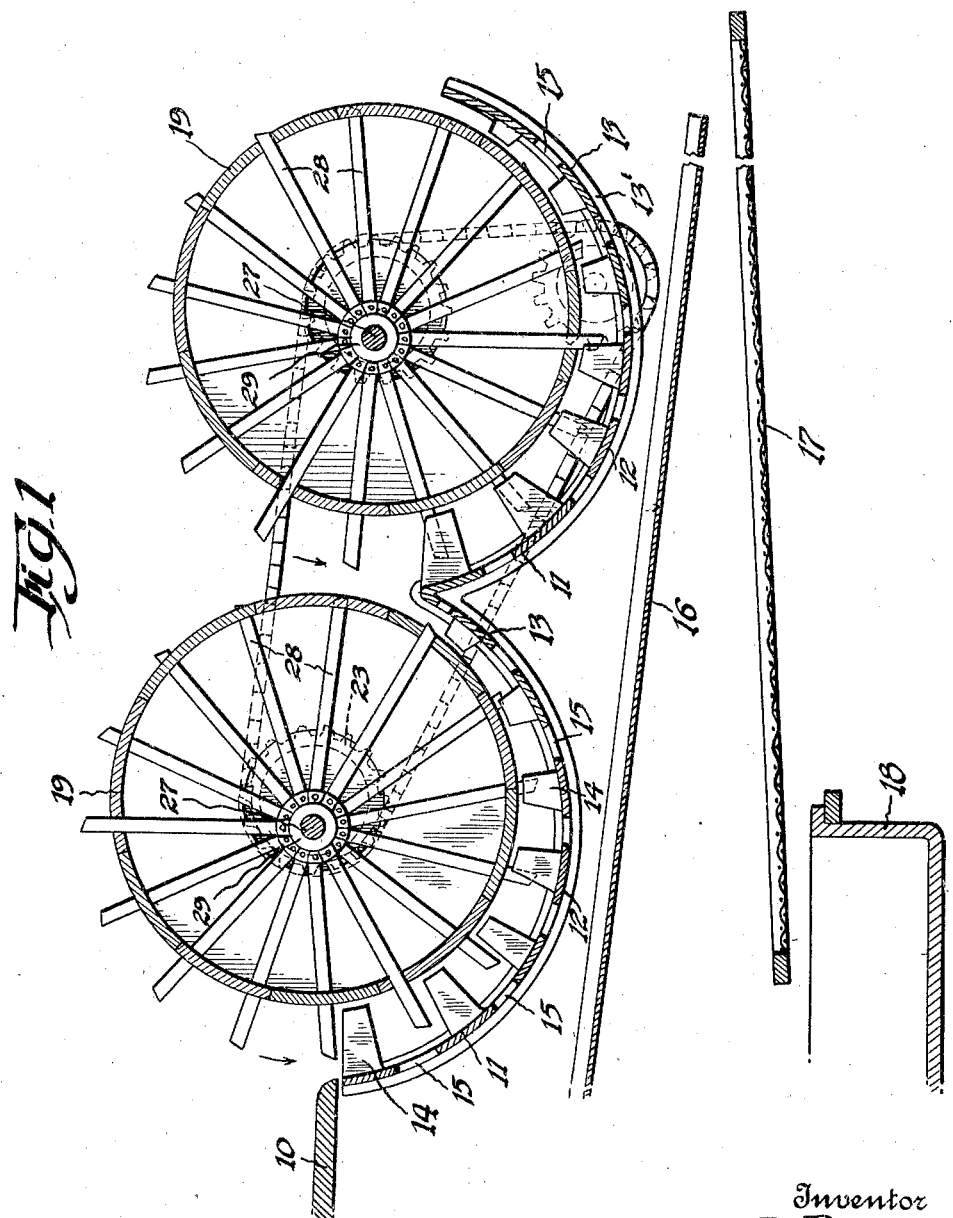

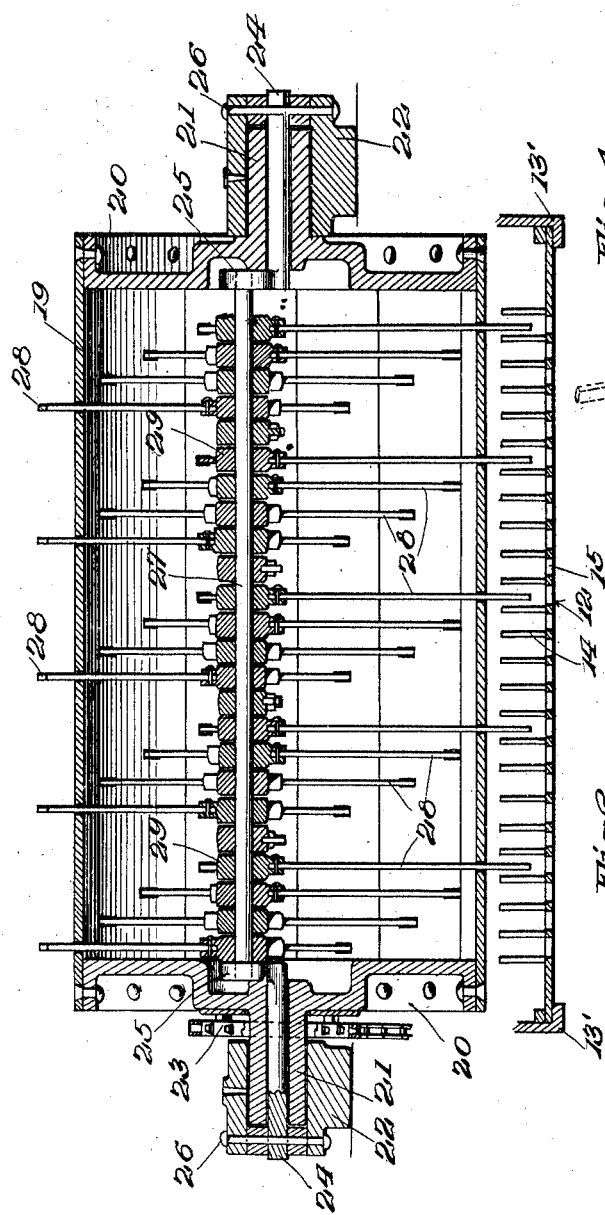
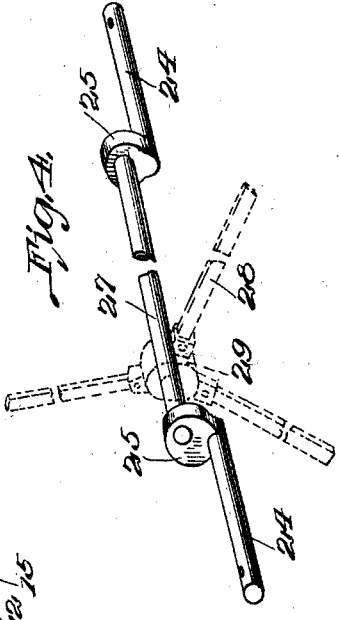
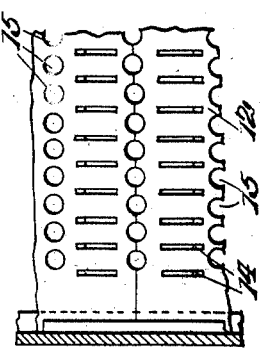

JOSEPH R. RUOS, OF DOYLESTOWN, PENNSYLVANIA, ASSIGNOR TO GENERAL MOTORS CORPORATION, OF DETROIT, MICHIGAN, A CORPORATION OF DELAWARE.

PEANUT PICKER OR SEPARATOR.

1,360,249.  Specification of Letters Patent.  Patented Nov. 23, 1920.

Application filed September 24, 1919. Serial No. 325,833.

*To all whom it may concern:*

Be it known that I, JOSEPH R. RUOS, citizen of the United States, residing at Doylestown, in the county of Bucks and State of Pennsylvania, have invented certain new and useful Improvements in Peanut Pickers or Separators, of which the following is a specification.

This invention relates to an improved peanut picker or separator and has as its primary object to provide a construction whereby peanuts may, without breaking, be picked or separated from the vines.

The invention has as a further object to provide a construction wherein the major portion of the peanuts picked will be permitted to fall directly through the concave of the machine, thus eliminating the necessity for later segregating such of the peanuts from the vines.

And the invention has as a still further object to provide a picker which will also be adapted for picking or separating beans and peas from the vines so that the machine will be adapted for general use.

Other and incidental objects will appear hereinafter. In the drawings:

Figure 1 is a fragmentary longitudinal sectional view of a machine embodying the present invention, Fig. 2 is a longitudinal sectional view taken through one of the cylinders employed as well as through the concave, Fig. 3 is a fragmentary plan view more particularly illustrating the construction of the concave, and Fig. 4 is a view particularly illustrating the mounting of the eccentric shaft of the device.

Referring now more particularly to the drawings, the numeral 10 indicates a feed table. In the rear of this table is mounted a double concave. Each portion of this concave is formed of a plurality of abutting transversely extending sections which, for convenience, have been indicated at 11, 12 and 13 respectively. These sections are supported at their ends by side members 13' and formed on the sections are spaced transversely extending rows of teeth 14. The teeth are graduated in length with each successive row, the initial row of teeth on the section 11 being the longest and the final row of teeth on the section 13 being the shortest. Formed through the concave between the adjacent rows of teeth as well as at the rear side of the final row of teeth on the section 13, are rows of openings 15. These openings are of a size to permit loose peanuts within the concave to fall therethrough. Suitably mounted beneath the concave is a tray 16 below which is arranged a sieve 17 and supported beneath this sieve at its lower end is a chute or drawer 18. Thus, peanuts falling through the concave will be caught by the tray 16 and discharged therefrom onto the sieve, when the peanuts will then be directed into the drawer or chute 18.

Coacting with the portions of the concave are companion cylinders. Each of these cylinders includes a shell 19 which is formed of a plurality of abutting longitudinally extending slats or staves and, as particularly shown in Fig. 2, these slats are, at their ends, riveted to flanged cylinder heads 20. Extending from the cylinder heads axially thereof are hollow trunnions 21 journaled in bearings 22 supported upon the frame of the picking machine. Keyed upon one of the trunnions of the front cylinder is a drive sprocket 23 over which is trained a drive chain from a suitable working part of the machine. In this connection it should be noted that the front and rear cylinders are appropriately coupled to revolve in unison. Extending freely through the trunnions 21 are brackets 24 provided at their inner ends with laterally directed heads 25 lying at the inner side of the cylinder head within the lines thereof. These brackets are tied by pins 26 extending through the bearings 22 and through the outer ends of the brackets. Extending between the bracket heads within the cylinder is an eccentric shaft 27 and mounted upon this shaft is a gang of radial picker teeth 28 projecting freely through the cylinder shell. The picker teeth are arranged in sets of three and the teeth of each set are secured at their inner ends to a hub 29. Each of these hubs is, at equally spaced points thereabout, provided with radially directed sockets into which the inner ends of the teeth of the hub are fitted and fastened by rivets or other suitable fastening devices. The teeth will thus be effectually secured to the hubs, and as will now be observed, the hubs are progressively stepped with respect to each other about the eccentric shaft so that the outer ends of the picker teeth will thus project through the cylinder shell in spaced helical rows. The teeth of each cylinder will thus be disposed to pass at their outer end portions between the teeth 14 of the several rows of teeth upon the respective portions of the concave.

Particular attention is now directed to the fact that, as shown in Fig. 1, the eccentric shafts 27 of the cylinders are so arranged that as the cylinders revolve and the teeth descend, the teeth of each helical row will be progressively projected from the cylinders to pass between the teeth of the concave while, as the teeth ascend, the teeth of each row will be progressively retracted. Thus, as the vines are fed from the table 10, the picker teeth 28 of the front cylinder will pull the vines between the teeth of the front portion of the concave for removing the peanuts therefrom. As the vines reach the abutting ends of the concave between the cylinders, the teeth of the front cylinder will be retracted to release the vines while the teeth of the rear cylinder will be projected to grasp the vines and then draw the vines between the teeth of the rear portion of the concave when the teeth of the rear cylinder will be retracted to finally release the vines. All of the peanuts will consequently be effectually removed from the vines while, at the same time, clogging of the cylinders will be prevented due to the retraction of the teeth thereon. The peanuts released from the vines will, of course, be shifted over the surface of the concave by the vines as they are drawn between the teeth of the concave. The peanuts will thus be moved over the rows of openings 15 in the concave to fall therethrough onto the tray 16 and it has been found in practice that the major portion of the peanuts will thus be discharged directly from the concave. Obviously, this constitutes a highly advantageous feature of the present invention since only a small percentage of the peanuts will be discharged with the vines from the concave to be later collected.

It will thus be seen that I provide a highly effective construction for the purpose set forth and while I have described the invention particularly as a machine for picking or separating peanuts from the vines still, as will now be appreciated in view of the preceding description, the invention is also well adapted for picking or separating beans or peas from the vines. I do not, therefore, wish to be limited in this regard.

Having thus described the invention, what is claimed as new is:

1. The combination of a concave provided with rows of teeth, the teeth of successive rows being graduated, a rotatable cylinder mounted to coact with the concave, an eccentric shaft extending within the cylinder and fixed with respect thereto, and teeth connected with said shaft and extending freely through the cylinder shell in spaced rows whereby the teeth of each row will be progressively projected from the shell to pass between the longer teeth of the concave as the teeth of the cylinder descend incident to rotation of the cylinder and will be progressively retracted as they pass between the shorter teeth of the concave as the teeth of the cylinder ascend.

2. The combination of a concave provided with teeth and having discharge openings therethrough, a rotatable cylinder mounted to coact with the concave, an eccentric shaft extending within the cylinder and fixed with respect thereto, and teeth connected with said shaft and extending freely through the cylinder shell whereby the teeth will be projected and retracted as the cylinder is rotated, the outer end portions of the teeth being arranged to pass between the teeth of the concave.

3. The combination of a double concave, a pair of cylinders mounted to coact therewith, teeth mounted eccentrically of the cylinders and freely extending through the shells thereof whereby the teeth will be projected and retracted longitudinally as the cylinders are rotated, and means coupling the cylinders to rotate in unison, the ascending teeth of one cylinder at the confronting sides of the cylinders being retracted while the descending teeth of the other cylinder are projected.

In testimony whereof I affix my signature.

JOSEPH R. RUOS. [L. S.]